(12) United States Patent
Fukuda

(10) Patent No.: US 7,320,655 B2
(45) Date of Patent: Jan. 22, 2008

(54) BICYCLE DERAILLEUR WITH A MISALIGNMENT INHIBITING STRUCTURE

(75) Inventor: Masahiko Fukuda, Amagasaki (JP)

(73) Assignee: Shimano, Inc., Sakai-ku, Sakai (JP)

( * ) Notice: Subject to any disclaimer, the term of this patent is extended or adjusted under 35 U.S.C. 154(b) by 298 days.

(21) Appl. No.: 10/605,036

(22) Filed: Sep. 3, 2003

(65) Prior Publication Data

US 2004/0116221 A1 Jun. 17, 2004

(30) Foreign Application Priority Data

Sep. 6, 2002 (JP) .............................. 2002-261901

(51) Int. Cl.
*F16H 9/00* (2006.01)
*B62M 9/12* (2006.01)

(52) U.S. Cl. .............................. 474/80; 474/82; 474/70

(58) Field of Classification Search .................. 474/70, 474/78, 80–82, 144; 74/606 A, 606 R, 421, 74/405, 425, 411, 625, 421 A, DIG. 13, 122, 74/138; 310/83, 91, 89, 99; 29/596, 893.37; 160/319

See application file for complete search history.

(56) References Cited

U.S. PATENT DOCUMENTS

| 3,919,891 | A | * | 11/1975 | Stuhlmuller et al. ........... 474/70 |
| 4,448,233 | A | * | 5/1984 | Rombouts .................... 160/319 |
| 4,616,164 | A | * | 10/1986 | Kenny et al. .......... 74/DIG. 10 |
| 4,706,512 | A | * | 11/1987 | McKernon et al. ............ 74/405 |
| 4,861,320 | A | | 8/1989 | Nagano |
| 5,681,234 | A | * | 10/1997 | Ethington ..................... 474/70 |
| 5,823,070 | A | * | 10/1998 | Taniguchi et al. ......... 74/606 R |
| 6,028,384 | A | * | 2/2000 | Billman et al. ................ 310/83 |
| 6,054,785 | A | * | 4/2000 | Kerdjoudj et al. ............ 74/425 |
| 6,118,197 | A | * | 9/2000 | Bohlen ........................ 310/89 |
| 6,293,882 | B1 | * | 9/2001 | Kitamura et al. ............. 474/80 |
| D451,072 | S | * | 11/2001 | Kerdjoudj et al. ......... D13/122 |
| 2003/0015059 | A1 | * | 1/2003 | Schwital et al. .......... 74/606 R |

FOREIGN PATENT DOCUMENTS

| DE | 4340471 C1 | | 2/1995 |
| EP | 543452 A1 | | 5/1993 |
| EP | 1010613 A | * | 6/2000 |
| EP | 1010613 A1 | | 6/2000 |
| JP | 10-181675 A | * | 7/1998 |
| JP | 2000-266177 A | * | 9/2000 |

* cited by examiner

*Primary Examiner*—Marcus Charles
(74) *Attorney, Agent, or Firm*—James A. Deland

(57) ABSTRACT

A bicycle derailleur comprises a first base member structured to be detachably mounted to a bicycle frame, wherein the first base member has a first abutment; a second base member structured to be mounted to the first base member, wherein the second base member has a second abutment that faces the first abutment of the first base member and the first and second base members define a housing space between them; a drive mechanism at least partially disposed in the housing space; a link mechanism that moves in response to movement of the drive mechanism; a chain guide coupled to the link mechanism for moving a chain among a plurality of sprockets; and a misalignment inhibiting structure disposed between the first base member and the second base member to inhibit misalignment of the drive mechanism as a result of an external force.

27 Claims, 4 Drawing Sheets

US 7,320,655 B2

BICYCLE DERAILLEUR WITH A MISALIGNMENT INHIBITING STRUCTURE

BACKGROUND OF INVENTION

The present invention is directed to bicycles and, more particularly, to a bicycle derailleur with a structure that inhibits misalignment of a drive mechanism relative to first and second base members.

Bicycles are used for general transportation as well as for sports and recreation. Such potential uses have resulted in the development of bicycles that are comfortable to ride under a variety of riding conditions and are suitable for a wide variety of riding purposes. Not surprisingly, bicycles that have some provision for the automation of various components to accommodate a particular riding environment have become very popular.

Most bicycles currently have transmissions that allow the rider to select a suitable gear ratio from among a plurality of available gear ratios as the riding conditions change. Such transmissions may include a derailleur that is detachably secured to the rear end of the bicycle frame and is used to engage a chain with one of a plurality of sprockets that are mounted on the hub axle of the rear wheel. Conventional rear derailleurs comprise a base member mounted on the rear end of the bicycle frame, a four-point link mechanism mounted to the base member, and a chain guide mounted to the four-point link mechanism. During operation of the rear derailleur, the four-point link mechanism moves the chain guide in the direction of the hub axle, and the chain guide switches the chain to a desired one of the plurality of sprockets.

Recently developed rear derailleurs include a drive mechanism, such as a rotating motor, housed within the base member. More specifically, the base member may comprise a plurality of members that form a housing space, and the drive mechanism may be disposed within the housing space. The four-point link mechanism is controlled by this drive mechanism, thus allowing the rear derailleur to be more easily operated in both automatic and manual shifting modes.

When such conventional bicycle drive mechanisms are mounted on the rear derailleur, the plurality of base members can become misaligned with each other due to impacts on the base member caused by falls as well as by vibrations and shocks caused by changes in the surface of the road. This also causes the drive mechanism to become misaligned in the housing space between the base members, thus adversely affecting the ability of the derailleur to precisely shift the chain from one sprocket to another.

SUMMARY OF INVENTION

The present invention is directed to various features of a bicycle derailleur. In one embodiment, a bicycle derailleur comprises a first base member structured to be detachably mounted to a bicycle frame, wherein the first base member has a first abutment; a second base member structured to be mounted to the first base member, wherein the second base member has a second abutment that faces the first abutment of the first base member such that the first and second base members define a housing space between them; a drive mechanism at least partially disposed in the housing space; a link mechanism that moves in response to movement of the drive mechanism; a chain guide coupled to the link mechanism for moving a chain among a plurality of sprockets; and a misalignment inhibiting structure disposed between the first base member and the second base member to inhibit misalignment of the drive mechanism as a result of an external force. Additional inventive features will become apparent from the description below, and such features alone or in combination with the above features may form the basis of further inventions as recited in the claims and their equivalents.

DETAILED DESCRIPTION

Figure 1:
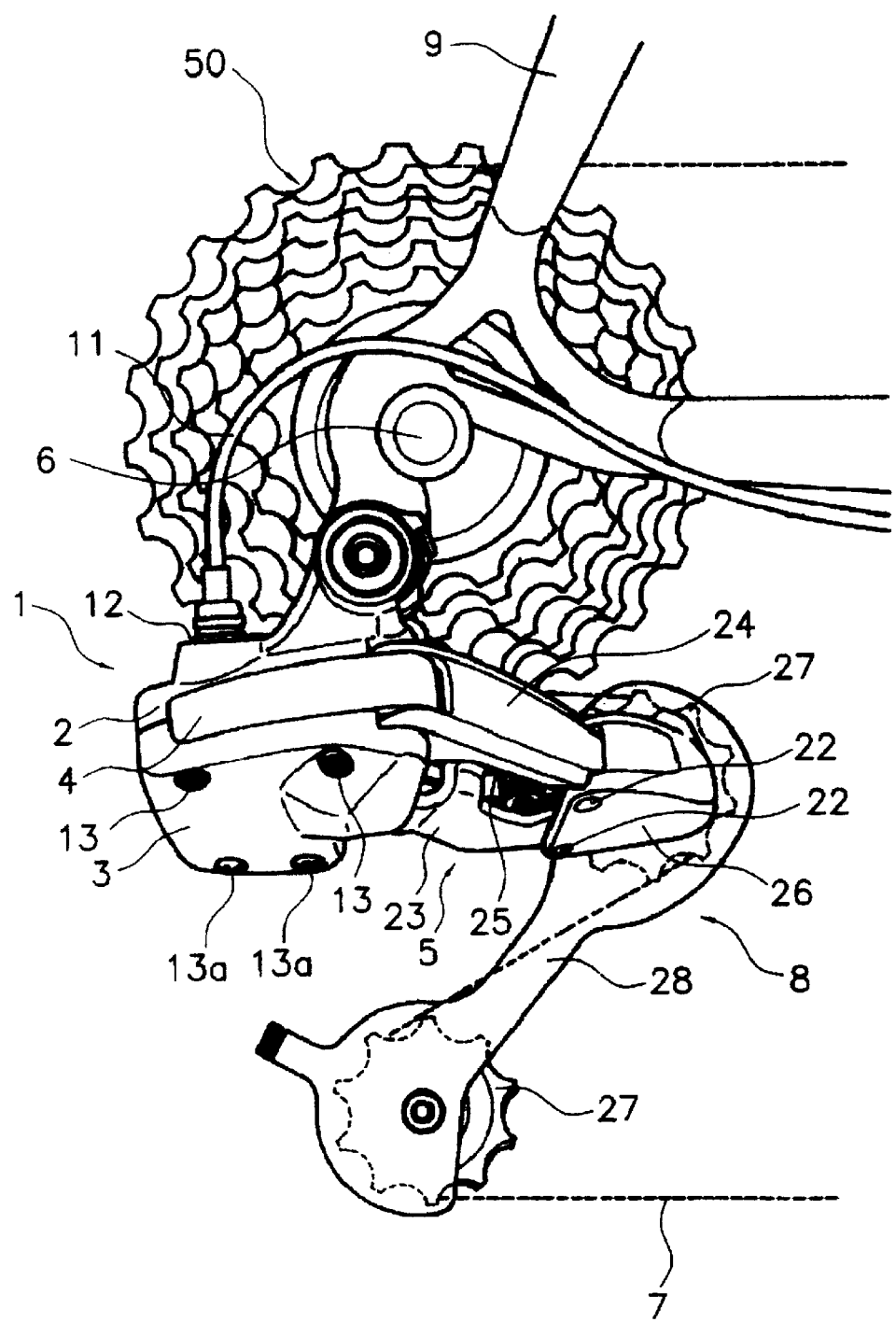
FIG. 1 is a side view of a particular embodiment of a derailleur.

FIG. 1 is a side view of a particular embodiment of a rear derailleur 1. Rear derailleur 1 comprises a first base member 2 and separate second base member 3, a drive mechanism 4 disposed between the first and second base members 2 and 3, a four-point link mechanism 5 pivotably coupled to the first and second base members 2 and 3, and a chain guide 8 pivotably coupled to the four-point link mechanism 5.

Figure 3:
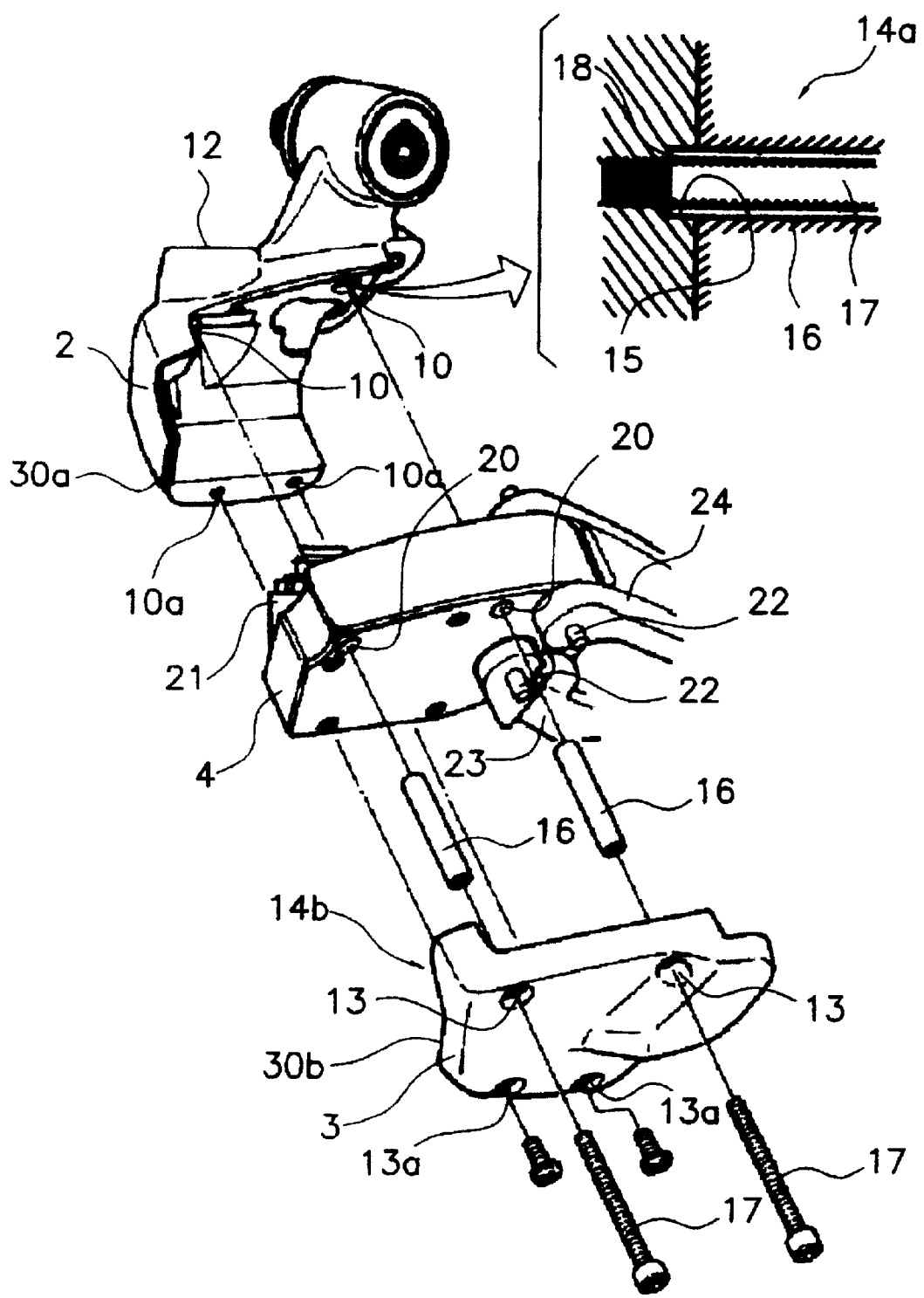
FIG. 3 is an exploded view of the base members and drive mechanism.

As shown in FIGS. 1 and 3, four-point link mechanism 5 comprises link shafts 22 mounted on the drive mechanism 4, first and second link members 23 and 24 pivotably mounted about the link shafts 22, a biasing member 25 that biases the first and second link members 23 and 24 in one of the pivoting directions, and a coupler 26 pivotably mounted to the other ends of the first and second link member 23 and 24. Biasing member 25 is mounted diagonally between the link shaft 22 at the first end of first link member 23 and the link shaft 22 at the second end of second link member 24.

As shown in FIG. 1, chain guide 8 comprises a pair of guide frames 28 that rotatably support a pair of guide sprockets 27 such that guide sprockets 27 are sandwiched between the pair of guide frames 28. Guide frames 28 are mounted to coupler 26 so that one end of each guide frame 28 pivots around an axis parallel to the hub axle 6.

First base member 2 is detachably mounted on the rear end of a bicycle frame 9. As shown in FIG. 3, first base member 2 forms a housing space that opens towards second base member 3, and an abutment 30a is formed on a side of first base member 2 that faces second base member 3. Threaded openings 10 are formed at an upper portion of first base member 2, and threaded openings 10a are formed at a lower portion of first base member 2, wherein the threaded openings 10 and 10a face second base member 3. A through hole 12 is formed in the top surface of first base member 2 to allow a control cable 11 to be attached to drive mechanism 4.

Second base member 3 forms a housing space that opens towards first base member 2, and an abutment 30b is formed on a side of second base member 3 that faces first base member 2. Bolt openings 13 are formed at an upper portion of second base member 3, and bolt openings 13a are formed at a lower portion of second base member 3, wherein the bolt openings 13 and 13a face the threaded openings 10 and 10a, respectively, in first base member 2. In this embodiment, abutments 30a and 30b contact each other when first base member 2 and second base member 3 are assembled together, and a housing space is formed on the inside of first and second base members 2 and 3.

A first misalignment-inhibiting or interlocking structure 14a is disposed between first base member 2 and second base member 3 at threaded openings 10 and bolt openings 13. As shown in the upper right portion of FIG. 3, first misalignment-inhibiting structure 14a comprises recesses 15 and tubular guides 16. Recesses 15 are concentrically formed in the mutually opposed faces of first and second base members 2 and 3 at threaded openings 10 and bolt holes 13. Tubular guides 16 pass through openings 20 in drive mechanism 4 and are disposed in recesses 15 such that the ends of tubular guides 16 contact floors 18 of recesses 15. Bolts 17 extend through bolt openings 13 and tubular guides 16 and screw into threaded openings 10 in first base member 2.

Figure 2:
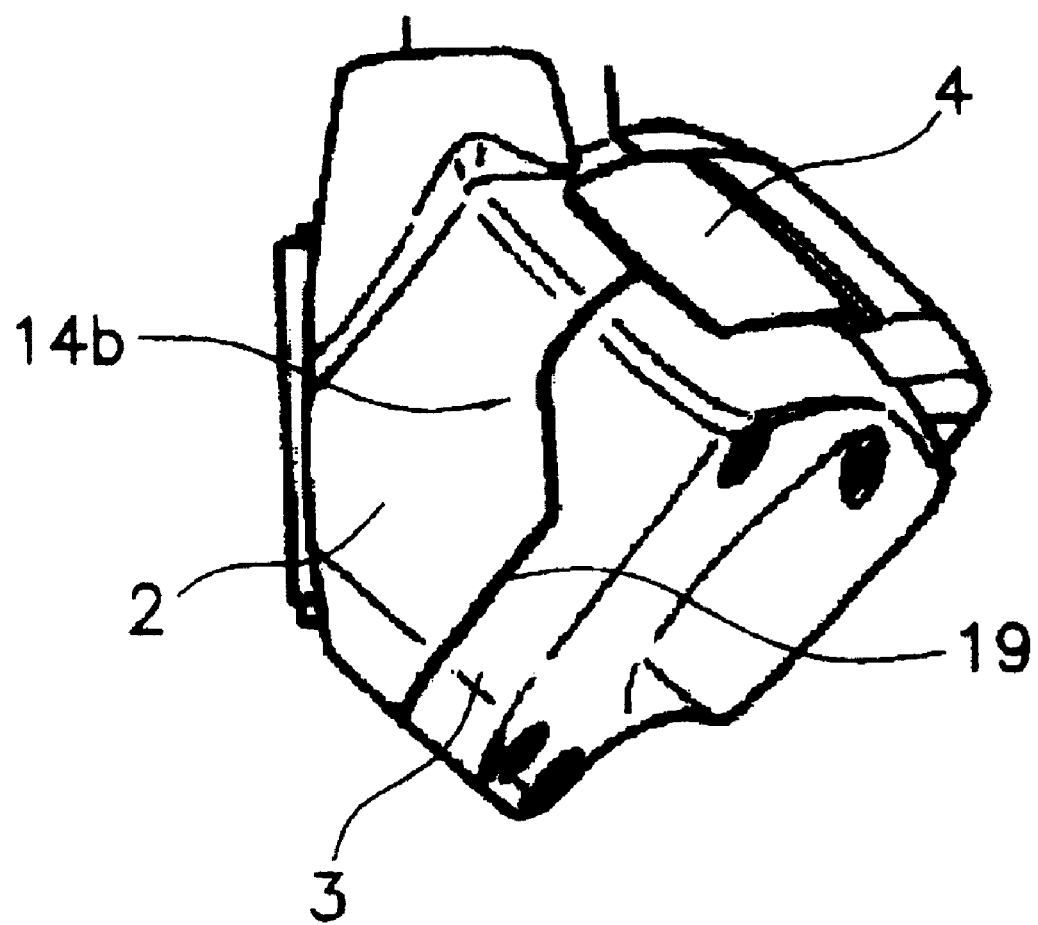
FIG. 2 is a view of a particular embodiment of a drive mechanism disposed between a pair of base members.

As shown in FIGS. 2 and 3, the shapes of first abutment 30a and second abutment 30b form a second misalignment-inhibiting or interlocking structure 14b at a junction 19 between first base member 2 and second base member 3. More specifically, first abutment 30a includes a substantially straight first abutment portion near the top of first base member 2, a substantially straight second abutment portion extending at an incline from the first abutment portion, and a substantially straight third abutment portion extending from the second abutment portion. The second abutment portion is inclined relative to the third abutment portion, and the first abutment portion is aligned offset substantially parallel to the third abutment portion. Similarly, second abutment 30b includes a substantially straight first abutment portion near the top of second base member 3, a substantially straight second abutment portion extending at an incline from the first abutment portion, and a substantially straight third abutment portion extending from the second abutment portion. The second abutment portion is inclined relative to the third abutment portion, and the first abutment portion is aligned offset substantially parallel to the third abutment portion.

Drive mechanism 4 is sandwiched between first base member 2 and second base member 3 and is positioned by the tubular guides 16 that extend through the openings 20 in drive mechanism 4. A cable attachment component 21 for the control cable 11 is provided on the side of drive mechanism 4 that faces first base member 2.

During operation, control signals for controlling drive mechanism 4 according to changes in the riding conditions are received by drive mechanism 4 through cable 11 at cable attachment component 21. Drive mechanism 4 operates in response to these control signals, and four-point link mechanism 5 mounted on link shafts 22 driven by drive mechanism 4 moves accordingly. When first and second link members 23 and 24 pivot, guide frames 28 move in the direction of the hub axle, and the chain 7 supported by guide sprockets 27 is switched to a desired one of the plurality of sprockets 50.

When a conventional derailleur is operated in this manner, first and second base members 2 and 3 can become misaligned if derailleur 1 is subjected to impact during falls or is subjected to vibrations and/or shocks resulting from changes in the road surface. This, in turn, causes misalignment of drive mechanism 4. Stress resulting from misalignment of first and second base members 2 and 3 also can be transmitted from first and second base members 2 and 3 through the attachment bolts to the drive mechanism 4. To ensure satisfactory derailleur performance in such circumstances, the stability of the drive mechanism 4 disposed between the first and second base members 2 and 3 must be maintained. In this embodiment, the first misalignment-inhibiting structure 14a prevents forces applied to the first and second base members 2 and 3 from being transmitted to the drive mechanism 4 because such forces are communicated through the tubular guides 16 from one base member to the other through the floors 18 in the recesses 15. In other words, the forces that could potentially be transmitted through the bolts 17 to the drive mechanism 4 is absorbed and buffered by the guides 16, thus protecting the drive mechanism 4 against such external forces. This makes it possible to maintain and ensure the stability of the drive mechanism 4 disposed between the first and second base members 2 and 3. The second misalignment-preventing member 14b also directly transmits forces between the first and second base members 2 and 3 through junction 19 and also inhibits relative rotation between the first and second base members 2 and 3 in response to external forces on the first and second base members 2 and 3. This, too, makes it possible to maintain and ensure the stability of the drive mechanism 4 disposed between the first and second base members 2 and 3.

Figure 4:
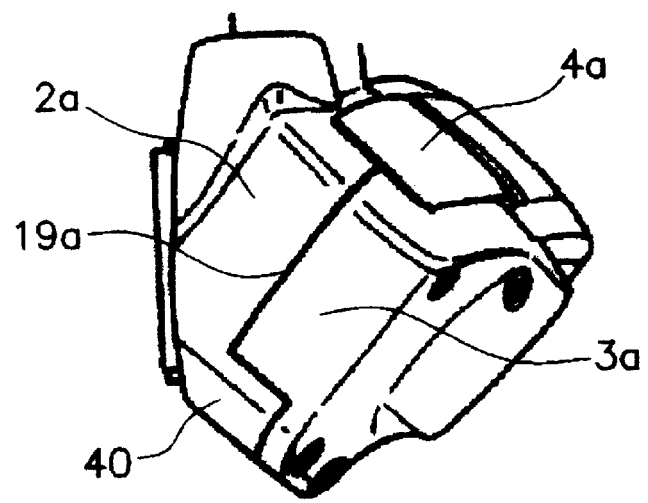
FIG. 4 is a view of another embodiment of a drive mechanism disposed between a pair of base members.

While the above is a description of various embodiments of inventive features, further modifications may be employed without departing from the spirit and scope of the present invention. For example, the first and second abutments 30a and 30b of the second misalignment inhibiting structure 14b in the above embodiment had an inclined intermediate portion, but the shape of the abutments can take many forms in order to resist external forces. As shown in FIG. 4, the intermediate portions of the abutments 30a and 30b may be perpendicular to one or both of the adjacent abutment portions to form a perpendicular abutment 40. Such an abutment helps to inhibit misalignment caused by shear forces applied to the first and second base members 2 and 3.

Figure 5:
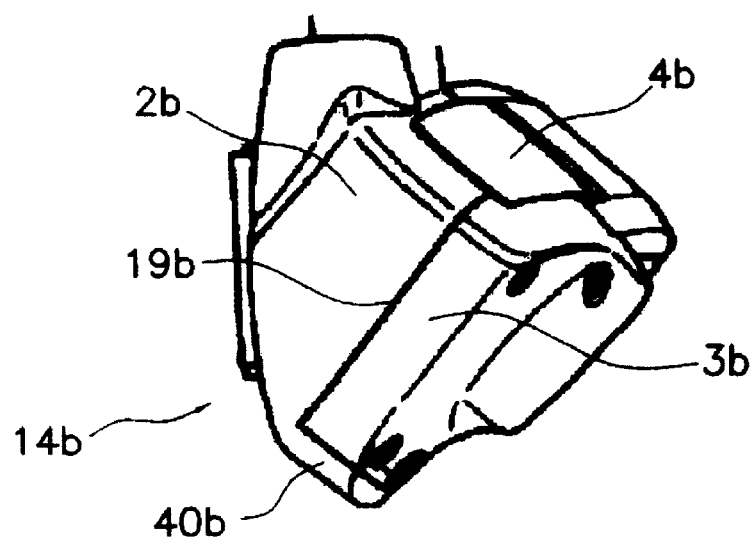
FIG. 5 is a view of another embodiment of a drive mechanism disposed between a pair of base members.

As shown in FIG. 5, a second misalignment-inhibiting structure 14b may include an abutment 40b provided at the bottom end of a first base member 2b for contacting the entire bottom surface of a second base member 3b. In this case as well, it is possible to inhibit misalignment resulting from shear forces applied to the first and second base members 2a and 2b and to inhibit frictional forces applied to the junction 19.

In the previous embodiments, the first base member 2 was directly bolted to the frame 9, but any attachment method that ensures integrity with the frame 9 may be used. For example, first base member 2 can be integrated with frame 9 by means of a bracket.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle derailleur comprising:
   a first base member structured to be detachably mounted to a bicycle frame, wherein the first base member has a first abutment;
   a second base member structured to be mounted to the first base member, wherein the second base member has a second abutment that faces the first abutment of the first base member;
   wherein the first base member and the second base member define a housing space therebetween;
   a drive mechanism having a drive mechanism housing at least partially disposed in the housing space;
   wherein the drive mechanism housing is separate from the first and second base members,
   a link mechanism having a link member that moves in response to movement of the drive mechanism;
   wherein the drive mechanism housing has a link shaft extending therefrom to which the link member is mounted for pivoting around a rotational axis of the link shaft;
   a chain guide coupled to the link mechanism for moving a chain among a plurality of sprockets; and
   a misalignment inhibiting structure disposed between the first base member and the second base member to inhibit misalignment of the drive mechanism housing by preventing forces applied to the first and second base members from being transmitted to the drive mechanism housing.

2. The derailleur according to claim 1 wherein the link mechanism comprises a four-point link mechanism.

3. The derailleur according to 2 wherein the link mechanism comprises:
   a first link member having a first end pivotably coupled to the link shaft and a second end pivotably coupled to the chain guide; and
   a second link member having a first end pivotably coupled to the drive mechanism and a second end pivotably coupled to the chain guide.

4. The derailleur according to claim 1 wherein the misalignment mechanism comprises an interlock mechanism to interlock the first base member with the second base member.

5. The derailleur according to claim 4 wherein the interlock mechanism inhibits relative rotation between the first base member and the second base member in at least one rotational direction.

6. The derailleur according to claim 5 wherein the interlock mechanism includes a shape of the first abutment and the second abutment.

7. The derailleur according to claim 6 wherein a first abutment portion of the first abutment is bent relative to a second abutment portion of the first abutment in a direction facing the second abutment.

8. The derailleur according to claim 7 wherein the first abutment portion is substantially perpendicular to the second abutment portion.

9. The derailleur according to claim 7 wherein the first abutment portion is inclined relative to the second abutment portion.

10. The derailleur according to claim 7 wherein the first abutment portion is substantially straight, and wherein the second abutment portion is substantially straight.

11. The derailleur according to claim 7 wherein the first abutment further comprises a third abutment portion that is bent relative to the second abutment portion.

12. The derailleur according to claim 11 wherein the second abutment portion is disposed between the first abutment portion and the third abutment portion.

13. The derailleur according to claim 12 wherein the second abutment portion is substantially perpendicular to at least one of the first abutment portion and the third abutment portion.

14. The derailleur according to claim 13 wherein the second abutment portion is substantially perpendicular to both the first abutment portion and the third abutment portion.

15. The derailleur according to claim 12 wherein the second abutment portion is inclined relative to at least one of the first abutment portion and the third abutment portion.

16. The derailleur according to claim 15 wherein the second abutment portion is inclined relative to both the first abutment portion and the third abutment portion.

17. The derailleur according to claim 12 wherein the first abutment portion is offset relative to the third abutment portion.

18. The derailleur according to claim 17 wherein the first abutment portion is aligned substantially parallel to the third abutment portion.

19. The derailleur according to claim 4 wherein the interlock mechanism comprises an interlock member coupled between the first base member and the second base member.

20. The derailleur according to claim 19 wherein the first base member has a first recess for receiving a first end of the interlock member therein, and wherein the second base member has a second recess for receiving a second end of the interlock member therein.

21. The derailleur according to claim 19 wherein the interlock member has a tubular shape.

22. The derailleur according to claim 21 wherein the first base member and the second base member are structured to accommodate a screw extending through the interlock member.

23. The derailleur according to claim 21 wherein the first base member has a first recess for receiving a first end of the interlock member therein, and wherein the second base member has a second recess for receiving a second end of the interlock member therein.

24. The derailleur according to claim 23 wherein the interlock mechanism includes a shape of the first abutment and the second abutment so that engagement of the first and second abutments inhibits relative rotation between the first base member and the second base member in at least one rotational direction.

25. The derailleur according to claim 24 wherein the first abutment contacts at least a portion of the second abutment.

26. The derailleur according to claim 1 wherein a portion of the drive mechanism housing is exposed at a location between the first and second base members.

27. A bicycle derailleur comprising:
   a first base member structured to be detachably mounted to a bicycle frame, wherein the first base member has a first abutment;
   a second base member structured to be mounted to the first base member, wherein the second base member has a second abutment that faces the first abutment of the first base member;
   wherein the first base member and the second base member define a housing space therebetween;

a drive mechanism having a drive mechanism housing at least partially disposed in the housing space;

a link mechanism that moves in response to movement of the drive mechanism;

a chain guide coupled to the link mechanism for moving a chain among a plurality of sprockets; and a misalignment inhibiting structure disposed between the first base member and the second base member to inhibit misalignment of the drive mechanism housing by inhibiting misalignment of the first base member and the second base member relative to each other as a result of an external force;

wherein the first and second base members are fastened together by a fastener that extends through the drive mechanism housing.

* * * * *